C. WALTER.
GLOBE VALVE.

No. 178,492.

Patented June 6, 1876.

Attest.
Clinton Kirby.
Charles Schamnell

Carl Walter per
Wm. Hubbell Fisher,
Att'y.

UNITED STATES PATENT OFFICE.

CARL WALTER, OF CINCINNATI, OHIO.

IMPROVEMENT IN GLOBE-VALVES.

Specification forming part of Letters Patent No. 178,492, dated June 6, 1876; application filed March 21, 1876.

*To all whom it may concern:*

Be it known that I, CARL WALTER, a resident of the city of Cincinnati, in the State of Ohio, have invented certain new and useful Improvements in Globe-Valves, of which the following is a specification:

My invention consists in constructing globe-valves in such a manner as to effectually prevent the escape of steam, gas, water, or vapors or fluids around the stem that actuates the valve, the details of the improvement, and the advantages resulting from the use of the same, being hereinafter more fully described.

Figure 1:
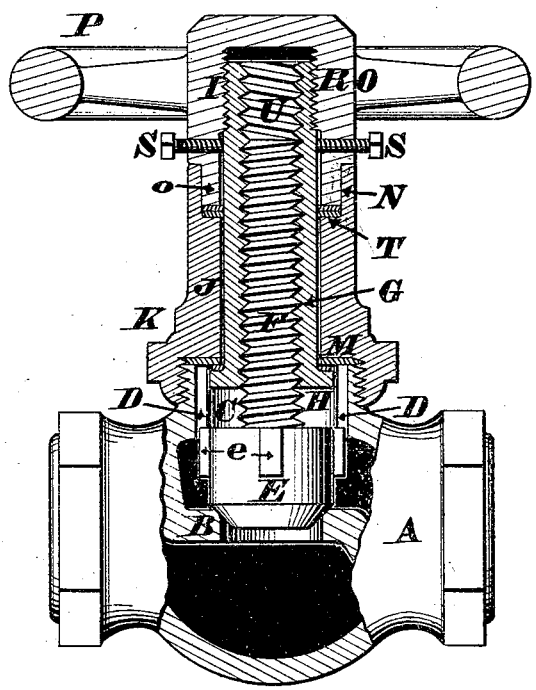
Figure 3:
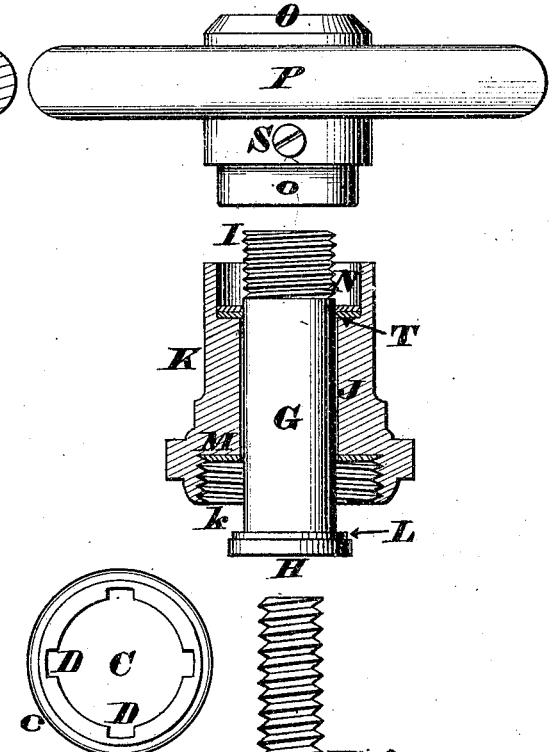
Figure 2:
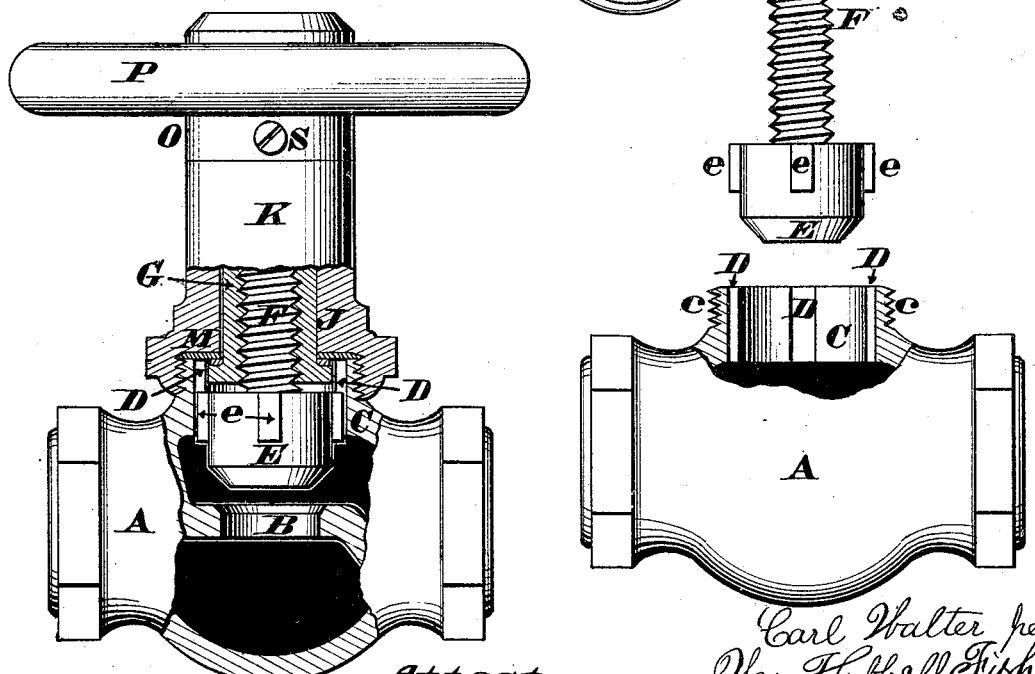

In the accompanying drawing, forming part of this specification, Figure 1 is a vertical section of my valve in its closed condition. Fig. 2 is a similar section, but showing the valve raised from its seat; and Fig. 3 represents by elevations and sections the various parts of my valve separated from each other.

The shell A, valve-seat B, and neck C may be as represented, or of any other approved form, as they constitute no part of my invention.

The neck C is screw-threaded externally at c, while its interior is cylindrical, and is furnished with one or more vertical grooves or channels, D, which latter are traversed by the radial wing or wings e of valve E. By this arrangement said grooves confine the valve to a proper vertical path, and at the same time prevent any rotation of said valve. The operating-stem of this valve consists preferably of a left-handed screw, F, of any suitable pitch, which screw engages with the tubular nut G, whose lower end carries a collar, H, while its upper end is screw-threaded at I. The aforesaid tubular nut fits snugly within the cylindrical box or housing K, that is screw-threaded at k to engage with the exterior thread of the neck C. The collar H carries a washer, L, that bears against a gasket, M, the latter being clamped between neck G and housing K, when the various parts of the valve are in position. The upper end of housing K is chambered out or counterbored at N to receive the diminished portion o of hub O, which hub is cast with, or otherwise attached to, the customary hand-wheel P. This hub is screw-threaded interiorly at R to admit the external thread I of nut G.

S represents one or more set-screws, which are tapped into the hub O, so as to bear against the nut G below its screw I. T represents washers or packing-rings at the bottom of counter-bore N. U is the interior or female thread of tubular nut G.

When the various parts of the device are fitted together and are in their normal positions the valve proper E is seated in its bearing B, and the guides or wings e occupy the lower portion of grooves D, as seen in Fig. 1.

To open the valve the wheel P is turned to the right, which act imparts a corresponding movement of nut G, through the instrumentality of retaining devices S, and the result is that the screw F is gradually run up within nut G U, the wings e and grooves D co-acting to prevent any rotation of valve E and its attached stem F.

The closure of the valve is effected by a reverse movement of the hand-wheel P, which causes the stem F to descend within nut G U, thereby forcing said valve down upon its bearing B.

It will be noticed that the wings e and grooves D prevent any rotation of the valve E, both when it is elevated and depressed, and as said valve is thus guided in a vertical path, and prevented grinding in its bearing B, the latter will last much longer and not be so liable to leak water, steam, or gas.

It will also be noticed that there is no opening through the hub O; neither is there any complicated stuffing-box for steam to leak through and scald the hands of the operator, as the two packed joints M and T effectually prevent the upward passage of steam within the housing K o of the device.

In some cases it may be found advisable to omit the hand-wheel P, and provide the hub O with a square head for the reception of a socket-wrench or other suitable device for rotating said hub.

Other appliances may be substituted for the wings e, to prevent rotation of valve E.

What I claim as new, and desire to secure by Letters Patent, is—

1. In combination with the shell A B C and non-rotatable valve E F, the housing J K and tubular nut G, whose interior is provided with a screw-thread engaging a screw-thread, F, upon the rod of valve E, and whose exterior is provided with a screw-thread, engaging a female screw in hub O, substantially as and for the purposes described.

2. In combination with the shell A B C, the non-rotatable valve E, tubular nut G, housing K, hub O, set-screw S, collar H, and packing or washers M T, all substantially as shown and described.

CARL WALTER.

Attest:
CLINTON KIRBY,
CHARLES SCHAMMEL.